(12) United States Patent
Karttunen et al.

(10) Patent No.: US 9,464,190 B2
(45) Date of Patent: Oct. 11, 2016

(54) BONDING BASE FOR ELECTRONIC COMPONENTS, AND METHOD

(75) Inventors: Mikko Karttunen, VTT (FI); Satu Kortet, Tampere (FI)

(73) Assignee: Teknologian Tutkimuskeskus VTT, VTT (FI)

( * ) Notice: Subject to any disclaimer, the term of this patent is extended or adjusted under 35 U.S.C. 154(b) by 576 days.

(21) Appl. No.: 13/321,432

(22) PCT Filed: May 14, 2010

(86) PCT No.: PCT/FI2010/050391
§ 371 (c)(1),
(2), (4) Date: Nov. 18, 2011

(87) PCT Pub. No.: WO2010/133759
PCT Pub. Date: Nov. 25, 2010

(65) Prior Publication Data
US 2012/0088883 A1    Apr. 12, 2012

(30) Foreign Application Priority Data

May 20, 2009 (EP) ..................................... 09160716

(51) Int. Cl.
*C08L 71/12* (2006.01)
*C08L 25/08* (2006.01)

(52) U.S. Cl.
CPC ............... *C08L 71/12* (2013.01); *C08L 25/08* (2013.01)

(58) Field of Classification Search
CPC ................................. C08L 25/08; C08L 71/12
USPC .......................................... 525/69, 232, 285
See application file for complete search history.

(56) References Cited

U.S. PATENT DOCUMENTS

| | | | |
|---|---|---|---|
| 3,660,531 A * | 5/1972 | Lauchlan ........................ | 525/98 |
| 4,141,876 A * | 2/1979 | Hansen ......................... | 524/505 |
| 4,252,913 A | 2/1981 | Katchman et al. | |
| 4,480,057 A * | 10/1984 | Sano ............................. | 523/206 |
| 4,745,157 A | 5/1988 | Yates, III et al. | |
| 4,816,515 A * | 3/1989 | Weiss ............................. | 525/68 |
| 5,081,185 A * | 1/1992 | Haaf et al. ..................... | 525/68 |
| 5,108,823 A | 4/1992 | Sirinyan et al. | |
| 5,268,064 A | 12/1993 | Woo et al. | |
| 5,310,792 A * | 5/1994 | Inoue ............................. | 525/64 |
| 5,434,220 A | 7/1995 | Yoshimura et al. | |
| 5,705,556 A | 1/1998 | Djiauw et al. | |
| 2002/0015820 A1* | 2/2002 | Puppin ......................... | 428/121 |
| 2002/0077447 A1* | 6/2002 | Hwang et al. ................ | 528/219 |
| 2003/0036713 A1* | 2/2003 | Bouton et al. ................ | 600/587 |
| 2003/0166781 A1* | 9/2003 | Berger et al. ................ | 525/191 |
| 2003/0225220 A1* | 12/2003 | Wang et al. .................. | 525/397 |
| 2004/0030012 A1 | 2/2004 | Sato | |
| 2007/0029530 A1* | 2/2007 | Noda ....................... | C08L 71/12 |
| | | | 252/511 |
| 2008/0090950 A1* | 4/2008 | Costanzi .................. | C08K 3/32 |
| | | | 524/414 |
| 2008/0203366 A1 | 8/2008 | Blackburn et al. | |
| 2010/0240813 A1* | 9/2010 | Terada .......................... | 524/133 |

FOREIGN PATENT DOCUMENTS

| | | |
|---|---|---|
| CN | 101195704 A | 6/2008 |
| EP | 0 352 486 A2 | 1/1990 |
| EP | 0 934 977 A1 | 8/1999 |
| EP | 1 863 037 A1 | 12/2007 |
| GB | 2 270 080 A | 3/1994 |
| JP | 4-285658 A | 10/1992 |
| JP | 2000-095907 A | 4/2000 |
| JP | 2005-057000 A | 3/2005 |
| JP | 2005-179397 A | 7/2005 |
| JP | 2006-316244 A | 11/2006 |
| WO | WO 2009060917 A1 * | 5/2009 |

OTHER PUBLICATIONS

European Search Report issued Oct. 28, 2009, in European Patent Application No. 09160716.8.
Feng et al., "Instantaneous in situ High Orientation Toughened Model of PPO/SEBS-G-MAH Blends," Chinese Journal of Materials Research (Apr. 2000), vol. 14, No. 2, pp. 127-132, with English abstract.
International Search Report issued Sep. 7, 2010, in PCT International Patent Application No. PCT/FI2010/050391.
Written Opinion of the International Searching Authority issued Sep. 7, 2010, in PCT International Application No. PCT/FI2010/050391.
English translation of Office Action issued Apr. 3, 2013, in Chinese Patent Application No. 201080022083.4.
Feng Wei et al., "Impact Fracture Surface and Microstructural Deformation Process of PPO/Elastomeric Sytrene-based Block Copolymers Blends," Chinese Journal of Materials Research (Apr. 2000), vol. 14, No. 2, pp. 153-158.
Second Office Action issued Feb. 24, 2014, in Chinese Patent Application No. 201080022083.4, with English translation.
Chinese Office Action and Search Report, issued Sep. 15, 2014, for Chinese Application No. 201080022083.4.
Wang, "Progress on Synthesis and Application of Polyphony Ether Alloy", China Rubber/Plastics Technology & Equipment, vol. 27, No. 6, Published Jun. 30, 2002, pp. 18-21, abstract only.

\* cited by examiner

*Primary Examiner* — Mark Kaucher
(74) *Attorney, Agent, or Firm* — Birch, Stewart, Kolasch & Birch, LLP

(57) ABSTRACT

A bonding base for electronic components, and a method. The bonding base comprises: a dielectric basic layer formed of a mixture comprising thermoplastic polymer, the polymer part of which mixture comprises 75 to 95% by weight of thermoplastic PPO, the polymer part further comprising 5 to 20% by weight of elastomer which is incompatible with PPO.

20 Claims, No Drawings

BONDING BASE FOR ELECTRONIC COMPONENTS, AND METHOD

BACKGROUND OF THE INVENTION

The invention relates to a bonding base for electronic components.

Further, the invention relates to a method for manufacturing a bonding base for electronic components.

Further still, the invention relates to a method for manufacturing a film-like product.

Materials based on thermosetting plastics are, as known, used as base materials for the electronics industry, the best-known of these materials being probably epoxy glass fibre laminate FR4. Thermoplastic-based base materials are also known, for example thermoplastic PPO-based Nor-CLAD used in sheet form.

The term 'base material for the electronics industry', hereinafter 'base material' refers here to the material used in manufacturing the dielectric basic layer of bases, circuit boards and other electronic components containing conductors as well as of structural elements used as bases of RFID antennas, for instance. A circuit board, for example, is manufactured of a preform or laminate comprising an insulating layer made of dielectric material and coated with electrically conductive material, such as copper. Various electric components, such as microprocessors and other integrated circuits, resistors, capacitors and the like standard components, may be attached to a circuit board. Further, a circuit board conducts signals and operating voltages to components and away from them. Furthermore, a circuit board may conduct waste heat away from components, function as a mechanical support structure of the components and protect the components against electromagnetic disturbances.

The electric properties of thermoplastic, PPO-based (polyphenylene oxide) base materials processed with melt processing methods are known to be good but their glass transition temperature ($T_g$) is low, which restricts the use of the material in manufacturing processes requiring temperatures of more than 130 to 150° C. Due to the low glass transition temperature, the thermal expansion coefficient of the material is relatively high, which makes the product design more difficult. The orientation generated at the manufacturing stage of the base material breaks down around the glass transition temperature. Further, the low glass transition temperature restricts the highest operating temperature of the end product, for example a mobile phone.

Biaxial orientation of PPO-based materials is not mentioned in literature. The orientability of a PPO compound having a high glass transition temperature cannot be predicted in advance. Surprisingly, the compounds according to the invention are biaxially orientable.

BRIEF DESCRIPTION OF THE INVENTION

An object of this invention is to provide a novel and an improved bonding base for the electronics industry, a method for manufacturing a bonding base for the electronics industry, and a method for manufacturing a film-like product.

The bonding base according to the invention is characterized in that it comprises: a dielectric basic layer formed of a mixture comprising thermoplastic polymer, the polymer part of which mixture comprises 75 to 95% by weight of thermoplastic PPO, the polymer part further comprising 5 to 20% by weight of elastomer which is incompatible with PPO.

The method according to the invention is characterized by forming the basic layer of the bonding base out of a mixture comprising thermoplastic polymer, the polymer part of the mixture having 75 to 95% by weight of thermoplastic PPO and 5 to 20% by weight of elastomer which is incompatible with PPO.

The method according to the invention for manufacturing a film-like product is characterized by manufacturing a mixture comprising thermoplastic PPO polymer and elastomer which is incompatible with it, manufacturing a sheet or film of the mixture by using a melt processing method, stretching said sheet or film in the longitudinal direction and in the transverse direction into a film.

It is to be noted that in this specification the term 'incompatible eleastomer' refers to such an elastomer that forms a separate phase in the mixture of PPO and the elastomer in question and that does not significantly lower the glass transition temperature of the PPO.

The term 'polymer part of the mixture' refers to the part of the mixture formed of polymeric components of the mixture. The polymer part of the mixture may comprise not only PPO and elastomer incompatible with PPO but also other polymeric components belonging to the polymer matrix.

An idea of the invention is that the properties of the PPO are improved by forming a mixture comprising, in addition to PPO, also elastomer which is incompatible with it.

An advantage of the invention is that the mixture has a high glass transition temperature, even more than 200° C., owing to which the mixture can be used in several manufacturing processes of bonding bases within the electronics industry. Further, the thermal expansion of the mixture is insignificant. Yet another advantage is that the mixture has a high impact strength, whereby products manufactured of the mixture may be used in applications in which even heavy impact-like loads may be directed at it.

The idea of an embodiment of the invention is that the polymer part of the mixture comprises 75 to 90% by weight of thermoplastic PPO, and which polymer part further comprises 9 to 20% by weight of elastomer which is incompatible with PPO. An advantage is that the impact strength of such a bonding base is very good. For lead-through, base materials of the electronics are provided with holes, for instance by boring. For this reason, the base material may not be notch-sensitive in an impact situation.

The idea of another embodiment of the invention is that the polymer part of the mixture comprises 88 to 90% by weight of PPO, 9 to 10% by weight of SEBs-g-MAH elastomer and 1 to 2% by weight of low-molecular-mass PPO. An advantage of such a mixture is that it has a particularly high impact strength and glass transition temperature. It is to be noted that the term 'low-molecular-mass PPO' refers, in this description, to PPO whose intrinsic viscosity is about 0.2 dl/g at most, preferably 0.12 dl/g at most.

The idea of another embodiment of the invention is that the mixture comprises liquid halogen-free fire retardant. An advantage is that a good fire endurance class is achieved, i.e. even class V0 according to the test method UL94.

The method according to the invention for manufacturing a film-like product provides the advantage that very thin film can be manufactured of a PPO mixture by biaxial stretching, for instance to form flexible bonding bases to meet the needs of electronic devices.

DETAILED DESCRIPTION OF THE INVENTION

In the following examples, the following materials are used unless stated otherwise:
- as reference material: NorCLAD (abbreviation reference), which is a known thermoplastic PPO-based circuit board material,
- PPO: lupiace PX 100L and PX 100F, manufacturer Mitsubishi Engineering-Plastics,
- SEBS-g-MAH-elastomer (abbreviation SEBS-MAH): Kraton FG1901X, manufacturer Kraton Polymers,
- low-molecular-mass PPO (abbreviation low-mol. PPO): SA120M, manufacturer GE Plastics,
- fire retardant 1 (abbreviation fire ret. 1): halogen-free Reofos RDP, manufacturer Great Lakes,
- fire retardant 2 (abbreviation fire ret. 2): halogen-free Ncendx P-30, manufacturer Albemarle Corp.,
- EPDM-g-MAH elastomer (abbreviation EPDM-MAH): Royaltuf 498, manufacturer Chemtura Corporation,
- EPDM-g-SAN elastomer (abbreviation EPDM-SAN): Royaltuf 372P20, manufacturer Chemtura Corporation,
- stabilizing agent 1 (abbreviation stabil. 1): Irganox 1010, manufacturer Ciba,
- stabilizing agent 2 (abbreviation stabil. 2): Irgafos 168, manufacturer Ciba.

Example 1

PPO mixtures according to Table 1 were manufactured with a Berstorff ZE 25×48 D2 screw compounder. The materials used in manufacturing the mixtures were dried before compounding. The materials were fed to a mixer either from one or two feed openings either manually or with feeders or scales.

TABLE 1

| Code | PPO (% by w.) | SEBS-MAH (% by w.) | low-mol. PPO (% by w.) | fire ret. 1 (% by w.) | fire ret. 2 (% by w.) | stabil. 1 (% by w.) | stabil. 2 (% by w.) |
|---|---|---|---|---|---|---|---|
| ECO84 | 89.1 | 9.9 | 1 | 0 | 0 | 0 | 0 |
| ECO85 | 87.75 | 9.75 | 2.5 | 0 | 0 | 0 | 0 |
| ECO75 | 85 | 10 | 5 | 0 | 0 | 0 | 0 |
| ECO76 | 82.87 | 9.75 | 4.88 | 2.5 | 0 | 0 | 0 |
| ECO77 | 80.75 | 9.50 | 4.75 | 5.0 | 0 | 0 | 0 |
| ECO56 | 82.9 | 14.6 | 0 | 2.5 | 0 | 0 | 0 |
| ECO57 | 80.75 | 14.25 | 0 | 5.0 | 0 | 0 | 0 |
| ECO58 | 78.6 | 13.9 | 0 | 7.5 | 0 | 0 | 0 |
| ECO50 | 90.3 | 4.75 | 0 | 0 | 5.0 | 0 | 0 |
| ECO51 | 85.5 | 9.5 | 0 | 0 | 5.0 | 0 | 0 |
| ECO104 | 86.67 | 9.65 | 0.98 | 2.5 | 0 | 0.1 | 0.4 |
| ECO105 | 85[1] | 10 | 5 | 0 | 0 | 0.1 | 0.4 |
| ECO3_1[2] | 76 | 19 | 0 | 0 | 0 | 0.1 | 0.4 |

[1] PPO lupiace PX 100F
[2] ECO3_1 further comprised 5% by weight of nanoclay as a filler, trade name Nanocor I.30P).

The completed mixtures were dried in a dehumidifying drier, usually at 80° C., and injection-moulded into a test sample with an Engel 200/50 HL extruder having a screw diameter of 25 mm. The set temperature of the extruder was about 275 to 285° C., depending on the mixture. The temperature of the mould was 105° C. A conventional bar mould and plate mould, 60 mm×60 mm, thickness 2.0 mm, were used as the mould.

The measured properties of the mixtures are shown in Table 2. The measured properties have been measured in the manner presented in the following.

Viscosity

The viscosities of the mixtures were mainly measured by using a Göttfert Rheograph 6000 capillary rheometer. The measurements were performed in the shear rate range of 20 to 2 000 1/s, at a measuring temperature of 300° C. The viscosity of the reference was measured by removing copper from the circuit board preform and by crushing the plate into crush which was melted.

Notched Charpy Impact Strength

The impact strength of the injection-moulded test samples was measured with a Ceast Resil 5.5 device (Charpy impact test). The ISO 179: 1993 (E) standard was followed in the test. A 1 J, 2 J or 5 J hammer was used in the test, depending on the toughness of the mixture. Ten test samples notched with a notch of 2 mm were measured from each mixture. The length of the samples was 80 mm, the width being 10 mm and the strength being 4 mm. The test was carried out and the samples were stored in a room with standard air conditioning (+23° C./50% R.H.). The test was carried out at the earliest 4 days after the test samples had been taken to the room. The strength of the NorCLAD sheet was 1.70 mm. The reference samples were manufactured by sawing them out of the sheet, from which copper had been removed, and by polishing the sawn surfaces.

Glass Transition Temperature ($T_g$)

A device TA Instruments MDSC 2920 (Differential Scanning Calorimetry) apparatus was used for measuring the glass transition temperature of the mixtures.

Dielectric Measurements

In the dielelectric measurements of the test samples, HP 4291A RF Impedance/Material Analyser device with a frequency range of 1 MHz to 1.8 GHz was used. The test fixture used was an HP 16453A Dielectric Test Fixture. The sample was attached between two gold-coated electrodes, and an adjustable spring force pressed the electrodes against the sample. A PTFE (Teflon) sample with a thickness of 2.1 mm was used as a calibration sample. The thickness of the samples was measured at several points with a micrometer screw. After the thickness measurements, an RF impedance measurement was carried out, in other words the complex transmission response of alternating current was measured as a function of frequency. The measurements of the reference sample were made from a circuit board preform from which copper had been removed.

Fire Test

The fire tests of the mixtures were carried out with the test method UL94. The test samples were manufactured by injection-moulding into a mould with dimensions of 35 mm×170 mm×2.3 mm (thickness). After this, the samples were sawn into a size of 125 mm×13 mm according to the standard. The samples were air-conditioned for 48 hours at a temperature of 23° C. and in a relative humidity RH of 50%. The sample under examination was set on fire with a Bunsen burner, after which it was monitored how the burning proceeded. The measurements of the reference sample were made from a circuit board preform from which copper had been removed.

TABLE 2

| Code | viscosity 40 1/s (Pas) | viscosity 100 1/s (Pas) | viscosity 400 1/s (Pas) | impact strength (kJ/m$^2$) | glass trans. temp. (° C.) | permittivity ($\epsilon_r$) | loss factor (tan δ) | fire test (UL 94) |
|---|---|---|---|---|---|---|---|---|
| Reference | 627 | 496 | 291 | 11.65 | 136.8 | 2.68 | 0.014 | V2 |
| ECO84 | 1500 | 1225 | 1270 | 150.6 | 209.8 | 2.60 | 0.010 | V1 |
| ECO85 | 1610 | 1280 | 1950 | 106.1 | 208.9 | 2.59 | 0.008 | — |
| ECO75 | 1400 | 1040 | 1400 | 100.1 | 207.7 | 2.62 | 0.013 | V1 |
| ECO76 | 1300 | 946 | 1010 | 121.5 | 193.4 | 2.63 | 0.011 | V0 |
| ECO77 | 1210 | 883 | 895 | 119.2 | 184.2 | 2.65 | 0.010 | V0 |
| ECO56 | 798 | 559 | 673 | 154.6 | 197.3 | 2.58 | 0.010 | — |
| ECO57 | 784 | 570 | 636 | 154.3 | 186.6 | 2.61 | 0.009 | V1 |
| ECO58 | 741 | 541 | 567 | 154.4 | 173.4 | 2.63 | 0.011 | V0 |
| ECO50 | 1900 | 1350 | 1280 | 15.5 | 189.4 | 2.63 | 0.011 | V0 |
| ECO51 | 1170 | 792 | 757 | 91.4 | 189.6 | 2.62 | 0.010 | — |
| ECO104 | 1430 | 1050 | 1210 | 81.19 | 198.1 | 2.61 | 0.012 | V0 |
| ECO105 | 1140 | 781 | 496 | 120.88 | 205.4 | 2.60 | 0.009 | — |
| ECO3_1 | 827 | 621 | 683 | 70.73 | 205.9 | 2.56 | 0.007 | — |

Viscosity

On the basis of the measurements, it can be noted that the viscosity of the mixtures according to the invention is on a level which allows them to be processed in a versatile manner with devices and methods known as such which are used for manufacturing thermoplastic plastic products, for example with extrusion, injection moulding, compression moulding and uniaxial or biaxial orientation.

Notched Charpy Impact Strength

The impact strength of the mixtures according to the invention was, as a main rule, higher than that of the NorCLAD used as reference. The impact strength of the mixture ECO 50 is on the order of that of the reference mixture and essentially lower than that of the other mixtures according to the invention. The best results were achieved with mixtures containing 1% by weight of low-molecular-mass PPO, or when the mixture contained 2.5 to 7.5% by weight of fire retardant and no low-molecular-mass PPO.

Glass Transition Temperature

The glass transition temperature of the mixtures according to the invention was essentially higher than that of the NorCLAD used as reference. Owing to the higher glass transition temperature, bonding bases manufactured of the mixtures according to the invention can be used in such manufacturing processes of bonding bases which include treatment of the bases at an elevated temperature. Further, a product in which the bonding base is included can be allowed to have a highest operating temperature that is significantly higher than previously. Further, the thermal expansion coefficient of the bonding base is essentially lower, which enables lower assembly tolerances than previously. The highest glass transition temperature was achieved with an ECO 84 mixture containing 1% by weight of low-molecular-mass PPO. Also 2.5% by weight and 5% by weight of low-molecular-mass PPO gave extremely good values, and all other mixtures according to the invention also had a higher glass transition temperature higher than the reference.

Dielectric Measurements

The electric properties of the mixtures according to the invention, such as the dielectric constant and loss factor, are lower than those of the reference material. A low dielectric constant and dielectric loss of the bonding base material have special significance in applications operating at high frequencies. A low dielectric constant allows a higher signal rate, and the lower the loss factor, the better the efficiency of the signal propagation.

Fire Test

The fire class of the reference is V2, whereas the fire class of the mixtures according to the invention is mainly V0 or at least V1. Thus, the mixtures according to the invention enable manufacturing of significantly more fireproof bonding bases. It is to be noted that the fire tests were only carried out for the mixtures whose fire test values are presented in Table 2.

Example 2

PPO mixtures according to Table 3 were manufactured in the same way as in Example 1. The mixtures of Example 2 did not contain fire retardants but it is obvious that suitable fire retardant, for example retardant mentioned in Example 1, can be added to them.

TABLE 3

| Code | PPO (% by w.) | EPDM-MAH (% by w.) | EPDM-SAN (% by w.) | low-mol. PPO (% by w.) | stabil. 1 (% by w.) | stabil. 2 (% by w.) |
|---|---|---|---|---|---|---|
| ECO109 | 85 | 10 | 0 | 5 | 0.1 | 0.4 |
| ECO110 | 85 | 0 | 10 | 5 | 0.1 | 0.4 |
| ECO111 | 95 | 5 | 0 | 0 | 0.1 | 0.4 |
| ECO112 | 90 | 10 | 0 | 0 | 0.1 | 0.4 |
| ECO113 | 85 | 15 | 0 | 0 | 0.1 | 0.4 |
| ECO114 | 95 | 0 | 5 | 0 | 0.1 | 0.4 |
| ECO115 | 90 | 0 | 10 | 0 | 0.1 | 0.4 |
| ECO116 | 85 | 0 | 15 | 0 | 0.1 | 0.4 |

The measurements of the PPO mixtures according to Table 3 were carried out in the same way as in Example 1. The measurement results are shown in Table 4.

TABLE 4

| Code | impact strength (kJ/m²) | glass transition temp. (° C.) | permittivity ($\epsilon_r$) | loss factor (tan δ) |
|---|---|---|---|---|
| Referenssi | 11.65 | 136.8 | 2.68 | 0.014 |
| ECO109 | 21.02 | 206.5 | — | — |
| ECO110 | 24.25 | 205.6 | — | — |
| ECO111 | 8.58 | 208.4 | 2.60 | 0.010 |
| ECO112 | 19.97 | 208.7 | 2.58 | 0.011 |
| ECO113 | 50.80 | 208.9 | 2.53 | 0.010 |
| ECO114 | 11.29 | 207.8 | 2.63 | 0.008 |
| ECO115 | 21.43 | 208.7 | 2.62 | 0.009 |
| ECO116 | 30.85 | 208.8 | 2.62 | 0.010 |

Viscosity

The completed mixtures were injection-moulded into test bar and plate moulds, as in Example 1. The viscosities of the mixtures were sufficiently low to be processable with known melt processing methods, such as extrusion and injection moulding.

Notched Charpy Impact Strength

As seen from Table 4, the impact strength of the mixtures according to the invention is significantly better or even multiple compared with the reference.

Glass Transition Temperature

The glass transition temperature of all mixtures according to the invention is significantly higher than that of the reference.

Dielectric Measurements

The electric properties of the mixtures according to the invention, such as the dielectric constant and loss factor, are lower than those of the reference material.

It is to be noted that the surface energy of the mixtures according to the invention could be raised to the level of the surface energy of pure PPO with corona or plasma treatment.

It is further to be noted that also other components, such as filler, reinforcements, colouring agents, processing auxiliaries and the like, may naturally be added to the mixtures according to the invention.

The filler may be for example nanoclay, typically montmorillonite, which has been exfoliated during compounding. Nanoclay allows, for example, the modulus of a thermoplastic PPO mixture to be raised and the impact strength to be increased. The filler may also be nanosilica, nanostructured POSS chemical, glass fibre or glass ball etc.

Example 3

A strip was manufactured of the mixtures ECO75, ECO 76 and ECO 3_1 by extrusion, using a sheet extrusion head (width 110 mm and extrusion head gap 0.6 mm). The temperature of the extrusion was 290° C. The width of the sheet became about 0.3 to 0.4 mm. Test pieces of the size of 80 mm×80 mm were cut out of the sheet for biaxial drawing.

Film was manufactured of the test pieces by drawing biaxially. A laboratory-scale device Bruckner Karo IV was used for drawing the film. Biaxial drawing was carried out simultaneously in two directions perpendicular to each other. The test piece was placed in fixtures, after which the test piece was moved to the heating unit of the apparatus. In the heating unit, the test piece was heated with air heating for 2 minutes.

In drawing the mixture ECO 75, a draw rate of 100%/s and a draw ratio of 2.2×2.2 and 2.3×2.3 were used. The set temperature was 260° C., in other words the drawing temperature of this mixture was 52.3° C. higher than the glass transition temperature of the mixture.

In drawing the mixture ECO 76, a draw rate of 100%/s and a draw ratio of 2.3×2.3 and 3×3 were used. The set temperature was 240° C., in other words the drawing temperature of this mixture was 46.6° C. higher than the glass transition temperature of the mixture.

In drawing the mixture ECO 3_1, a draw rate of 40%/s and a draw ratio of 2.5×2.5 were used. The set temperature was 250° C., in other words the drawing temperature of this mixture was 44.1° C. higher than the glass transition temperature of the mixture.

The minimum widths of the oriented films were the following: ECO 75 24 μm, ECO 76 10 to 28 μm and ECO 3_1 136 μm. The surfaces of the oriented films were so smooth that the surface of the film may well be provided with, for example, a conductive pattern that conducts electricity.

The drawing temperatures of the films made in laboratory scale may be essentially lower than stated above. The draw-down of the mixtures ECO75 and ECO76 at a temperature over the glass transition temperature was also tested as follows: Test pieces with a length of 130 mm and a width of 25 mm were cut out of the extrusion strips. The test pieces were drawn with an Instron testing machine at 230° C. at a draw rate of 1 m/min. The tensile strength of the ECO75 material was 0.4 MPa, the tensile strength of the ECO76 material being 0.2 MPa. The drawing temperature was 22.3° C. higher than the glass transition temperature of the ECO75 material and 36.6° C. higher than the glass transition temperature of the ECO76 material. The PPO mixtures according to the invention were drawable into a thin film with a low strength.

Biaxial orientation according to the example, performed for the PPO mixtures, showed that a thin film with a smooth surface profile can well be manufactured for applications of the flexible electronics. It is obvious that biaxial orientation may also be carried out at two stages, for example by drawing an extruded preform first in the longitudinal direction and then, at the next stage, in the transverse direction.

Lupiace PX 100L grade with a viscosity of 0.47 dl/g was used as PPO polymer in the example. When manufacturing a compound according to the invention out of the lupiace PX 100F grade with a viscosity of 0.38 dl/g, even lower orientation temperatures can be used than for the lupiace PX 100L grade.

For manufacturing a film manufactured biaxially, continuous apparatuses may be used which are generally used for manufacturing biaxially oriented films. Depending on the formula of the PPO mixtures, the drawing temperature may be high, even more than 220° C.

A flexible bonding base for the electronics, having excellent electric properties compared with present bonding bases for the electronics, can be manufactured of the PPO material according to the invention with biaxial drawing. Thus, PET and PEN films as well as thermo-setting polyimide film (PI) may be replaced with mixtures according to the invention in manufacturing flexible base materials.

It is still to be added that the polymer part of the mixture may further comprise halogen-free liquid fire retardant in which the amount of halogen-free fire retardant may be, for instance, 2 to 8% by weight of the polymer part of the mixture. The permittivity of the bonding base is preferably less than 2.68, and the loss factor is less than 0.014, measured at a frequency of 1 Ghz. The basic layer of a bonding base or its initial stage may be formed of the mixture comprising thermoplastic polymer by using a melt processing method. In addition, filler may be included in the mixture. The intrinsic viscosity of low-molecular-mass PPO is preferably 0.12 dl/g at most.

In some cases, features presented in this application may be used as such, irrespective of other features. On the other hand, features presented in this application may, if required, be combined to form various combinations.

The drawings and the related description are only intended to illustrate the idea of the invention. Details of the invention may vary within the claims.

The invention claimed is:
1. A manufacturing material for circuit boards, comprising:
   a dielectric basic layer formed of a mixture comprising thermoplastic polymer,
   the polymer part of which mixture comprises 75 to 95% by weight of thermoplastic polyphenylene oxide (PPO), the polymer part further comprising:
   5 to 20% by weight of elastomer which is incompatible with polyphenylene oxide, that forms a separate phase in a mixture of polyphenylene oxide and said elastomer, wherein
   said elastomer comprises at least one of EPDM-g-MAH, SEBS-g-MAH and EPDM-g-SAN, and wherein
   the loss factor of the manufacturing material is less than 0.014, measured at a frequency of 1 GHz.
2. The manufacturing material according to claim 1, wherein the polymer part of the mixture comprises 75 to 90% by weight of thermoplastic polyphenylene oxide and 9 to 20% by weight of said elastomer which is incompatible with polyphenylene oxide.
3. The manufacturing material according to claim 1, wherein the incompatible elastomer comprises maleic anhydride grafted styrene-ethylene-butylene-styrene elastomer.
4. The manufacturing material according to claim 1, wherein the incompatible elastomer comprises maleic anhydride grafted ethylene-propylene-diene elastomer.
5. The manufacturing material according to claim 1, wherein the incompatible elastomer comprises styrene acrylonitrile grafted ethylene-propylene-diene-elastomer.
6. A method for manufacturing a manufacturing material for circuit boards, the method comprising:
   forming the basic layer of the manufacturing material out of a mixture comprising thermoplastic polymer, the polymer part of the mixture having:
   75 to 95% by weight of thermoplastic polyphenylene oxide, and
   5 to 20% by weight of elastomer which is incompatible with polyphenylene oxide, that forms a separate phase in a mixture of polyphenylene oxide and said elastomer,
   wherein said elastomer comprises at least one of EPDM-g-MAH, SEBS-g-MAH and EPDM-g-SAN, and
   wherein the loss factor of the manufacturing material is less than 0.014, measured at a frequency of 1 GHz.
7. A method according to claim 6, whereby the polymer part of the mixture comprises 75 to 90% by weight of thermoplastic polyphenylene oxide and 9 to 20% by weight of elastomer which is incompatible with polyphenylene oxide.
8. A method according to claim 6, further including 0.5 to 5% by weight of low-molecular-mass polyphenylene oxide in the polymer part of the mixture.
9. A method according to claim 6, said mixture having:
   82 to 90% by weight of polyphenylene oxide,
   9 to 10% by weight of maleic anhydride grafted styrene-ethylene-butylene-styrene elastomer, and
   1 to 5% by weight of low-molecular-mass polyphenylene oxide in the polymer part of the mixture, wherein the intrinsic viscosity of the low-molecular-mass polyphenylene oxide is 0.12 dl/g at most.
10. A method according to claim 6, whereby the incompatible elastomer comprises maleic anhydride grafted ethylene-propylene-diene elastomer.
11. A method according to claim 6, whereby the incompatible elastomer comprises styrene acrylonitrile grafted ethylene-propylene-diene elastomer.
12. A method according to claim 6, whereby forming the basic layer of the manufacturing material or its initial stage out of the mixture comprising thermoplastic polymer by using biaxial orientation.
13. A method for manufacturing a sheet or film, the method comprising
   manufacturing a mixture comprising 75 to 95% by weight of thermoplastic polyphenylene oxide polymer and 5 to 20% by weight of elastomer which is incompatible with it, that forms a separate phase in a mixture of polyphenylene oxide and said elastomer,
   manufacturing a sheet or film of the mixture by using a melt processing method, and
   stretching said sheet or film in the longitudinal direction and in the transverse direction into a film,
   wherein said elastomer comprises at least one of EPDM-g-MAH, SEBS-g-MAH and EPDM-g-SAN, and
   wherein the loss factor of the mixture is less than 0.014, measured at a frequency of 1 GHz.
14. A method according to claim 13, whereby forming the dielectric basic layer of the manufacturing material for circuit boards out of the film.
15. A method according to claim 6, wherein the incompatible elastomer comprises maleic anhydride grafted styrene-ethylene-butylene-styrene elastomer.
16. The manufacturing material according to claim 1, wherein said mixture consists essentially of said PPO and said elastomer.
17. The manufacturing material according to claim 1, wherein said mixture consists of said PPO and said elastomer and one or more optional components selected from the group consisting of fire retardant, stabilizer, and filler.
18. The manufacturing material according to claim 17, which contains fire retardant.
19. The manufacturing material according to claim 18, which contains liquid halogen free fire retardant.
20. The manufacturing material according to claim 1, which contains stabilizer.

* * * * *